(12) United States Patent
Ao et al.

(10) Patent No.: US 8,635,913 B2
(45) Date of Patent: Jan. 28, 2014

(54) ULTRASONIC COUPLER ASSEMBLY

(75) Inventors: Xiaolei Shirley Ao, Lexington, MA (US); Oleg Alexander Khrakovsky, Lynn, MA (US); Christopher Alan Frail, Natick, MA (US); Amber Yue Ma, Burlington, MA (US)

(73) Assignee: General Electric Company, Schenectady, NY (US)

( * ) Notice: Subject to any disclaimer, the term of this patent is extended or adjusted under 35 U.S.C. 154(b) by 337 days.

(21) Appl. No.: 13/091,464

(22) Filed: Apr. 21, 2011

(65) Prior Publication Data

US 2012/0266679 A1   Oct. 25, 2012

(51) Int. Cl.
*G01N 29/28*   (2006.01)

(52) U.S. Cl.
USPC ............................................ 73/644

(58) Field of Classification Search
USPC .................. 73/644, 861.25, 861.28
See application file for complete search history.

(56) References Cited

U.S. PATENT DOCUMENTS

| | | | |
|---|---|---|---|
| 3,575,050 A | 4/1971 | Lynnworth | |
| 3,973,152 A | 8/1976 | Karplus | |
| 4,286,470 A | 9/1981 | Lynnworth | |
| 4,320,659 A | 3/1982 | Lynnworth et al. | |
| 4,336,719 A | 6/1982 | Lynnworth | |
| 4,373,401 A | 2/1983 | Baumoel | |
| 4,783,997 A | 11/1988 | Lynnworth | |
| 4,787,252 A | 11/1988 | Jacobson et al. | |
| 5,159,838 A | 11/1992 | Lynnworth | |
| 5,251,490 A | 10/1993 | Kronberg | |
| 5,515,733 A | 5/1996 | Lynnworth | |
| 5,600,073 A | 2/1997 | Hill | |
| 5,856,622 A * | 1/1999 | Yamamoto et al. | 73/861.28 |
| 6,047,602 A | 4/2000 | Lynnworth | |
| 6,349,599 B1 | 2/2002 | Lynnworth et al. | |
| 7,343,821 B2 | 3/2008 | Panicke et al. | |
| 7,526,966 B2 * | 5/2009 | Gysling et al. | 73/861.23 |
| 7,624,650 B2 * | 12/2009 | Gysling et al. | 73/861.27 |
| 7,673,526 B2 * | 3/2010 | Bailey et al. | 73/861.27 |
| 2009/0007694 A1 * | 1/2009 | Breeuwer | 73/861.25 |
| 2011/0271770 A1 * | 11/2011 | Wiest et al. | 73/861.28 |

* cited by examiner

*Primary Examiner* — J M Saint Surin

(74) *Attorney, Agent, or Firm* — Hiscock & Barclay LLP

(57) ABSTRACT

An ultrasonic coupler assembly for coupling an ultrasonic transducer to a pipe wall is disclosed, wherein the ultrasonic coupler is configured using three quadrilateral sections to reduce the temperature extreme to which the ultrasonic transducer is exposed and to improve the quality of the ultrasonic signal passing through the ultrasonic coupler.

20 Claims, 5 Drawing Sheets

ULTRASONIC COUPLER ASSEMBLY

BACKGROUND OF THE INVENTION

This invention relates generally to ultrasonic flow rate measurement, and more particularly to an ultrasonic coupler assembly.

Ultrasonic flow meters are used to determine the flow rate (i.e., mean pipe flow rate ($V_m$)) of a variety of fluids (e.g., liquids, gases, etc.) in the fluid flowing in pipes of different sizes and shapes. In one type of ultrasonic flow meter employing transit time flow metering, one or more pairs of ultrasonic transducers can be attached to the exterior of the pipe wall, where each pair can contain ultrasonic transducers located upstream and downstream from each other, forming an ultrasonic path between them. Each ultrasonic transducer, when energized, transmits an ultrasonic signal (e.g., a sound wave) along an ultrasonic path through the flowing fluid that is received by and detected by the other ultrasonic transducer. The path velocity (i.e., path or chord velocity ($V_p$)) of the flowing fluid averaged along an ultrasonic path can be determined as a function of the differential between (i) the transit time of an ultrasonic signal traveling along the ultrasonic path from the downstream ultrasonic transducer upstream to the upstream ultrasonic transducer against the flow direction, and (2) the transit time of an ultrasonic signal traveling along the ultrasonic path from the upstream ultrasonic transducer downstream to the downstream ultrasonic transducer with the flow direction.

Knowledge of the flow rate of the fluid can enable other physical properties or qualities of the fluid to be determined. For example, in some custody-transfer applications, the flow rate can be used to determine the total volume (Q) of a fluid (e.g., water, oil, or gas) being transferred from a seller to a buyer through a pipe to determine the costs for the transaction, where the total volume is equal to the flow rate multiplied by the cross sectional area (A) of the pipe integrated over the time of flowing. In some applications (e.g., in refineries or nuclear power plants), the pipes to which the ultrasonic flow meters are attached are carrying high temperature fluids (e.g., coke in a refinery at 400° C.) that cause the pipe walls to also reach extremely high temperatures, or are carrying cryogenic fluids (e.g., liquefied natural gas) that cause the pipe walls to also reach extremely low temperatures. The ultrasonic transducers attached to those extreme temperature pipe walls are heated or cooled by the extreme temperatures of the pipes and therefore must be constructed of proper materials that increase the cost of these ultrasonic transducers. For example, an ultrasonic transducer rated at +200° C. or greater can be significantly more expensive than an ultrasonic transducer rated at +100° C. Similarly, an ultrasonic transducer rated at −200° C. or less can be significantly more expensive than an ultrasonic transducer rated at −100° C. In addition, even when constructed of the proper materials for extreme temperature applications, an ultrasonic transducer consistently exposed to extreme temperatures will experience thermal stresses that can diminish the useful life of the device.

In certain existing ultrasonic flow meter installations, an ultrasonic coupler is installed between the ultrasonic transducer and the pipe wall such that the ultrasonic transducer is not in direct contact with the pipe wall and therefore is not directly exposed to the extreme temperatures of the pipe wall. In this configuration, for example, one end of the ultrasonic coupler experiences the direct heat transfer from the pipe wall. The ultrasonic transducer attached at the other end of the ultrasonic coupler is not directly exposed to the extreme temperatures of the pipe wall, but instead is only exposed to the lower temperatures of the ultrasonic coupler closer to ambient room temperature. Therefore, the ultrasonic transducer can be rated to withstand a narrower temperature range. While these ultrasonic couplers can eliminate the need for an ultrasonic transducer rated at a higher temperature range, they can also introduce errors or uncertainty in the flow measurements provided by the ultrasonic flow meter. For example, certain ultrasonic couplers require that the ultrasonic signal beam transmitted by the ultrasonic transducer be redirected in the ultrasonic coupler between the ultrasonic transducer and pipe wall, introducing a possible error if the ultrasonic coupler is not manufactured according to strict tolerances and design criteria. Similarly, the ultrasonic signal traveling through certain ultrasonic couplers can be distorted or bent by isotherms formed in the ultrasonic coupler that change the direction of the ultrasonic signal beam. Therefore, there is a need to reduce the required temperature rating of an ultrasonic transducer without negatively impacting the accuracy of flow measurements provided by the ultrasonic flow meter.

The discussion above is merely provided for general background information and is not intended to be used as an aid in determining the scope of the claimed subject matter.

BRIEF DESCRIPTION OF THE INVENTION

An ultrasonic coupler assembly for coupling an ultrasonic transducer to a pipe wall is disclosed, wherein an ultrasonic coupler is configured using three quadrilateral sections to reduce the temperature extreme to which the ultrasonic transducer is exposed and to improve the quality of the ultrasonic signal passing through the ultrasonic coupler. An advantage that may be realized in the practice of some disclosed embodiments of the ultrasonic coupler assembly is the lowering of the required temperature rating of the ultrasonic transducer used in high temperature applications and increasing the number of applications that a particular ultrasonic transducer can be used to make flow measurements. In addition, by reducing the temperature extreme to which the ultrasonic transducer is exposed, the life of the ultrasonic transducer can be extended.

In one exemplary embodiment, an ultrasonic coupler assembly for coupling an ultrasonic transducer to a pipe wall is disclosed. The ultrasonic coupler assembly comprises a first quadrilateral section, a second quadrilateral section, and a rhomboid section between and connecting the first quadrilateral section and the second quadrilateral section.

In another exemplary embodiment, the ultrasonic coupler assembly comprises a first trapezoid section, a second trapezoid section, and a rhomboid section between and connecting the first trapezoid section and the second trapezoid section, wherein the rhomboid section comprises a top side extending from the right end of the top side of the first trapezoid section to the left end of the top side of the second trapezoid section, a bottom side extending from the right end of the bottom side of the first trapezoid section to the left end of the bottom side of the second trapezoid section, a left side adjacent to the right side of the first trapezoid section, and a right side adjacent to the left side of the second trapezoid section, wherein the top side is parallel to the bottom side, the left side is parallel to the right side, the left side forms an acute angle with the top side and an obtuse angle with the bottom side, and the right side forms an obtuse angle with the top side and an acute angle with the bottom side, wherein the first trapezoid section comprises a top side extending from the right end of the top side of the rhomboid section, a bottom side extending from the left end of the bottom side of the rhomboid section, a right side adjacent to the left side of the rhomboid section, and a left side, wherein the top side is parallel to the bottom side, the right side forms right angles with the top side and the bottom side, and the left side forms an acute angle with the top side and an obtuse angle with the bottom side, and wherein the second trapezoid section comprises a top side extending from the right end of the top side of the rhomboid section, a bottom side extending from the right end of the bottom side of the rhomboid section, a left side adjacent to the right side of the rhomboid section, and a right side, wherein the top side is parallel to the bottom side, the left side forms right angles with the top side and the bottom side, and the right side forms an obtuse angle with the top side and an acute angle with the bottom side.

In yet another exemplary embodiment, the ultrasonic coupler assembly comprises a first orthogonal parallelogram section, a second orthogonal parallelogram section, and a rhomboid section between and connecting the first orthogonal parallelogram section and the second orthogonal parallelogram section, wherein the rhomboid section comprises a top side extending from the right end of the top side of the first orthogonal parallelogram section to the left end of the top side of the second orthogonal parallelogram section, a bottom side extending from the right end of the bottom side of the first orthogonal parallelogram section to the left end of the bottom side of the second orthogonal parallelogram section, a left side adjacent to the right side of the first orthogonal parallelogram section, and a right side adjacent to the left side of the second orthogonal parallelogram section, wherein the top side is parallel to the bottom side, the left side is parallel to the right side, the left side forms an acute angle with the top side and an obtuse angle with the bottom side, and the right side forms an obtuse angle with the top side and an acute angle with the bottom side, wherein the first orthogonal parallelogram section comprises a top side extending from the left end of the top side of the rhomboid section, a bottom side extending from the left end of the bottom side of the rhomboid section, a right side adjacent to the left side of the rhomboid section, and a left side, wherein the top side is parallel to the bottom side, the right side is parallel to the left side, the right side forms right angles with the top side and the bottom side, and the left side forms right angles with the top side and the bottom side, and wherein the second orthogonal parallelogram section comprises a top side extending from the right end of the top side of the rhomboid section, a bottom side extending from the right end of the bottom side of the rhomboid section, a left side adjacent to the right side of the rhomboid section, and a right side, wherein the top side is parallel to the bottom side, the right side is parallel to the left side, the left side forms right angles with the top side and the bottom side, and the right side forms right angles with the top side and the bottom side.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

An ultrasonic coupler assembly for coupling an ultrasonic transducer to a pipe wall is disclosed, wherein an ultrasonic coupler is configured using three quadrilateral sections to reduce the temperature extreme to which the ultrasonic transducer is exposed and to improve the quality of the ultrasonic signal passing through the ultrasonic coupler.

Figure 1:
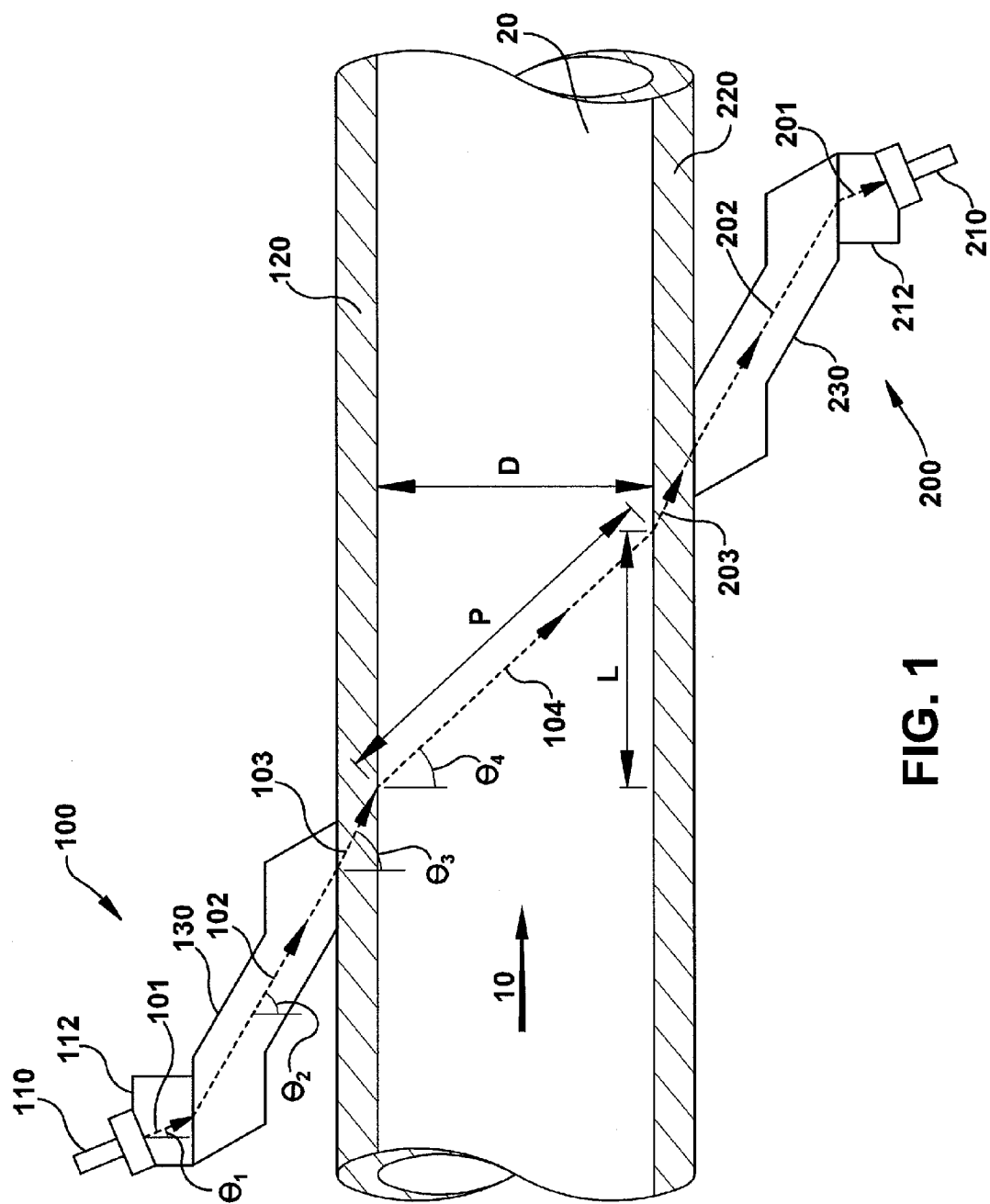
FIG. 1 is a cross-section of an ultrasonic flow meter installed on a pipe employing transit time flow metering to determine the flow rate of a fluid in an exemplary embodiment of the invention.
Figure 2:
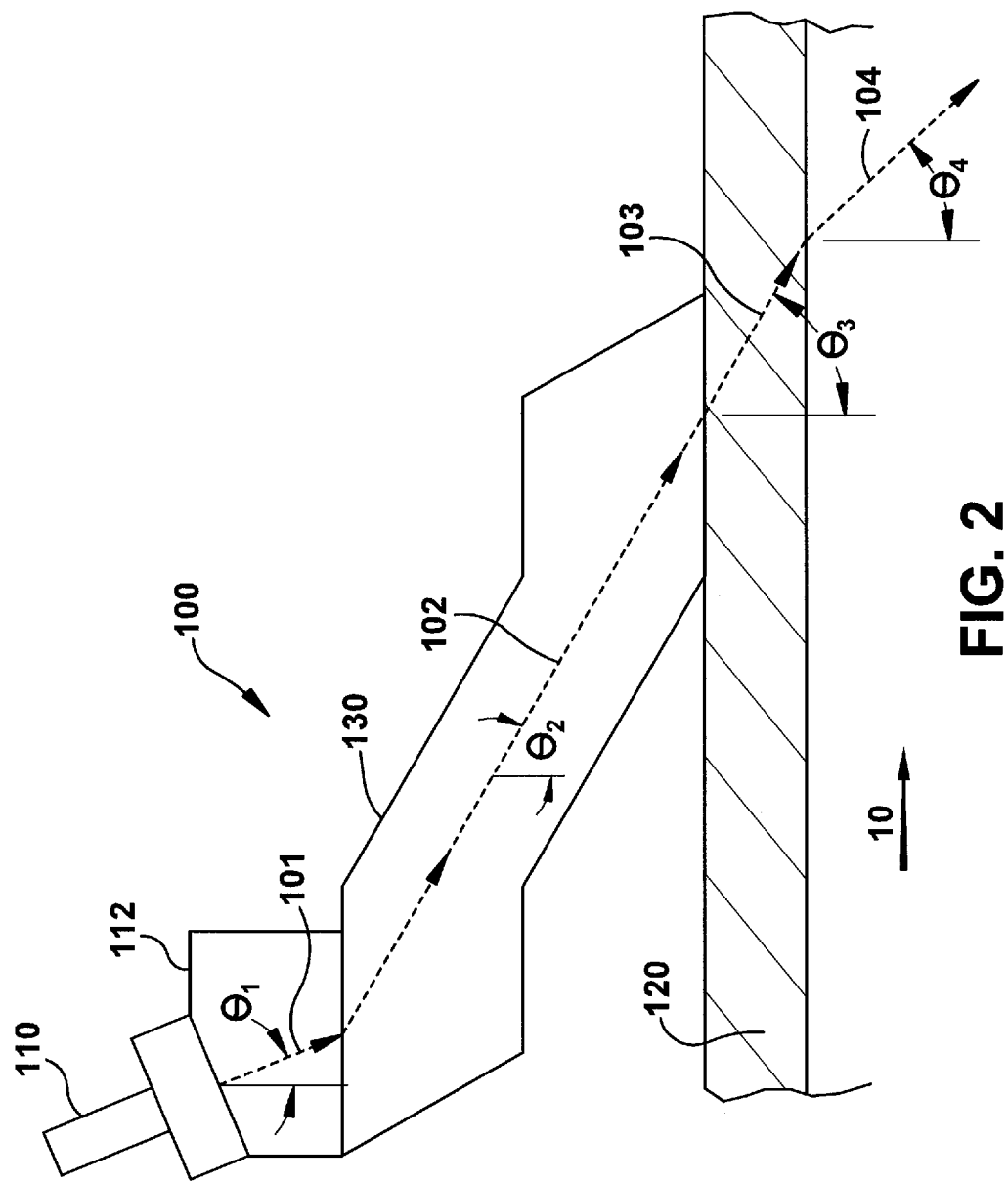
FIG. 2 is an enlarged cross-section view of a portion of the ultrasonic flow meter of FIG. 1 showing an ultrasonic coupler assembly installed on a pipe in an exemplary embodiment of the invention.

FIG. 1 is a cross-section of an ultrasonic flow meter installed on a pipe 20 employing transit time flow metering to determine the flow rate of a fluid in an exemplary embodiment of the invention. FIG. 2 is an enlarged cross-section view of a portion of the ultrasonic flow meter of FIG. 1 showing an ultrasonic coupler assembly 100 installed on a pipe wall 120 in an exemplary embodiment of the invention. Although FIG. 1 shows a single pair of ultrasonic transducers 110, 210 forming a single ultrasonic path 104 through the fluid, it will be understood by a person of ordinary skill in the art that two or more pairs of ultrasonic transducers 110, 210, each forming separate ultrasonic paths, can be used to form a multi-path ultrasonic flow meter.

Based on the flow direction 10, one ultrasonic transducer 110 can be installed upstream of the downstream ultrasonic transducer 210 on the pipe 20. The ultrasonic path 104 through the fluid can be through the central axis (i.e., diameter (D)) of the pipe 20 or on chordal paths (i.e., path not through the central axis of the pipe 20). Each ultrasonic transducer 110, 210, when energized, transmits an ultrasonic signal through the flowing fluid that is received by and detected by the other ultrasonic transducer 210, 110.

For simplicity, FIGS. 1 and 2 only show the transmission of an ultrasonic signal from the upstream ultrasonic transducer 110 to the downstream ultrasonic transducer 210, although, in a typical ultrasonic flow meter, there would also be transmission of an ultrasonic signal from the downstream ultrasonic transducer 210 to the upstream ultrasonic transducer 110. Also, in another embodiment, not shown, the ultrasonic transducers 110, 210 can be located on the same wall of the pipe 20 with the ultrasonic signal reflected off of the opposite wall.

The path velocity ($V_p$) of the fluid averaged along an ultrasonic path 104 through the fluid can be determined as a function of the differential between the upstream transit time ($t_{up}$) (i.e., the time of an ultrasonic signal traveling along the ultrasonic path 104 through the fluid from the downstream ultrasonic transducer 210 upstream to the upstream ultrasonic transducer 110 against the flow direction 10) and the downstream transit time ($t_{dn}$) (i.e., the time of an ultrasonic signal traveling along the ultrasonic path 104 through the fluid from the upstream ultrasonic transducer 110 downstream to the downstream ultrasonic transducer 210 with the flow direction 10) of the ultrasonic signals. In the presence of fluid flowing, the downstream transit time ($t_{dn}$) traveling with the flow direction 10 is faster (or shorter) than the upstream transit time ($t_{up}$) traveling against the flow direction 10. Since the transit time differential ($\Delta t$) is proportional to the path velocity ($V_p$) of the fluid, the path velocity ($V_p$) of the fluid averaged along the ultrasonic path 104 through the fluid can be determined as a function of the transit time differential ($\Delta t$) as well as other known parameters, such as the pipe 20 diameter (D), ultrasonic path length (P), the angle ($\theta_4$) formed between the ultrasonic path 104 through the fluid and the plane normal to the flow direction 10 (and the surface of the upper pipe wall 120 and lower pipe wall 220), and the projection (L) of the path length (P) along the pipe axis as shown in FIGS. 1 and 2:

$$V_p = \frac{P}{2}\left(\frac{t_{up} - t_{dn}}{(t_{dn} \times t_{up})\cos\theta_4}\right) \quad (1)$$

$$\cos\theta_4 = \frac{L}{P} \quad (2)$$

$$V_p = \frac{P^2}{2L}\left(\frac{t_{up} - t_{dn}}{t_{dn} \times t_{up}}\right) \quad (3)$$

As shown in FIGS. 1 and 2, the ultrasonic signal generated by the upstream ultrasonic transducer 110 forms an ultrasonic path 101 through an upstream wedge 112, an ultrasonic path 102 through an upstream ultrasonic coupler 130, and an ultrasonic path 103 through the upper pipe wall 120 before forming the ultrasonic path 104 through the fluid. Similarly, after passing through the fluid, the ultrasonic signal generated by the upstream ultrasonic transducer 110 forms an ultrasonic path 203 through the lower pipe wall 220, an ultrasonic path 202 through a downstream ultrasonic coupler 230, and an ultrasonic path 201 through a downstream wedge 212 before being received by the downstream ultrasonic transducer 210. Removable shear wave transducers or longitudinal angle beam transducers can be used to generate broadband shear wave ultrasonic signals. In one embodiment, the longitudinal ultrasonic signal from the upstream ultrasonic transducer 110 passing through the upstream wedge 112 converts to shear mode at the interface of the upstream wedge 112 and the upstream ultrasonic coupler 130. As the ultrasonic signal passes through the different objects, its angle and speed changes based on angles of incidence, angles of refraction, and the speed of sound of the materials of the objects in a relationship given by Snell's law:

$$\frac{c_1}{\sin\theta_1} = \frac{c_2}{\sin\theta_2} = \frac{c_3}{\sin\theta_3} = \frac{c_4}{\sin\theta_4} \quad (4)$$

where
$c_1$=speed of sound in the upstream wedge 112;
$c_2$=speed of sound in the upstream ultrasonic coupler 130;
$c_3$=speed of sound in the upper pipe wall 120;
$c_4$=speed of sound in the fluid;
$\theta_1$=angle formed between the ultrasonic path 101 through the upstream wedge 112 and the plane normal to the flow direction 10 (and the surface of the upper pipe wall 120 and lower pipe wall 220);
$\theta_2$=angle formed between the ultrasonic path 102 through the upstream ultrasonic coupler 130 and the plane normal to the flow direction 10 (and the surface of the upper pipe wall 120 and lower pipe wall 220);
$\theta_3$=angle formed between the ultrasonic path 103 through the upper pipe wall 120 and the plane normal to the flow direction 10 (and the surface of the upper pipe wall 120 and lower pipe wall 220); and
$\theta_4$=angle formed between the ultrasonic path 104 through the fluid and the plane normal to the flow direction 10 (and the surface of the upper pipe wall 120 and lower pipe wall 220).

Referring to FIG. 2, in one embodiment, the ultrasonic coupler 130, 230 is made of a material with low heat conductance (e.g., stainless steel) that matches the material of the pipe wall 120, 220 to minimize reflection of the ultrasonic signal at the interface point between the ultrasonic coupler 130, 230 and the pipe wall 120, 220. The thickness of the ultrasonic coupler 130, 230 (e.g., 0.25 in (6.35 mm), 0.50 in (12.70 mm), 0.75 in. (19.05 mm), 1.00 in. (25.40 mm)) can be chosen to handle a wide range of ultrasonic signals (e.g., from 0.1 MHz to 4.0 MHz) and provide good heat dissipation. In one embodiment, the thickness of the ultrasonic coupler 130, 230 can be significantly smaller than the other dimensions of the ultrasonic coupler 130, 230 to provide a high aspect ratio.

This configuration also provides only a small surface to conduct heat from the pipe wall 120, 220 to the ultrasonic coupler 130, 230, and to conduct heat from the ultrasonic coupler 130, 230 to the wedge 112, 212 and/or ultrasonic transducer 110, 210. The high aspect ratio of the ultrasonic coupler 130, 230 conditions the ultrasonic signal as it passes through the ultrasonic coupler 130, 230. This configuration also allows the temperature of the interface between the ultrasonic coupler 130, 230 and the ultrasonic transducer 110, 210 and/or the wedge 112, 212 to be significantly lower than the temperature of the pipe wall 120, 220, reducing of the temperature to which the ultrasonic transducer 110, 210, including its piezo material, is exposed, lowering the required temperature rating and cost of the ultrasonic transducer 110, 210, and extending its life. For example, an ultrasonic transducer 110, 210 rated at 150° C. can be used in an ultrasonic flow meter for fluid operating at 400° C. In addition, packing materials for the ultrasonic transducer 110, 210, such as epoxy and rubber, can be used in high temperature applications since the ultrasonic transducer 110, 210 is not exposed to the high operating temperatures. In many cases, this flexibility can eliminate the lengthy and expensive certification process for ultrasonic flow meters as a single ultrasonic transducer 110, 210 can be used for a number of different high and low temperature applications.

Figure 3:
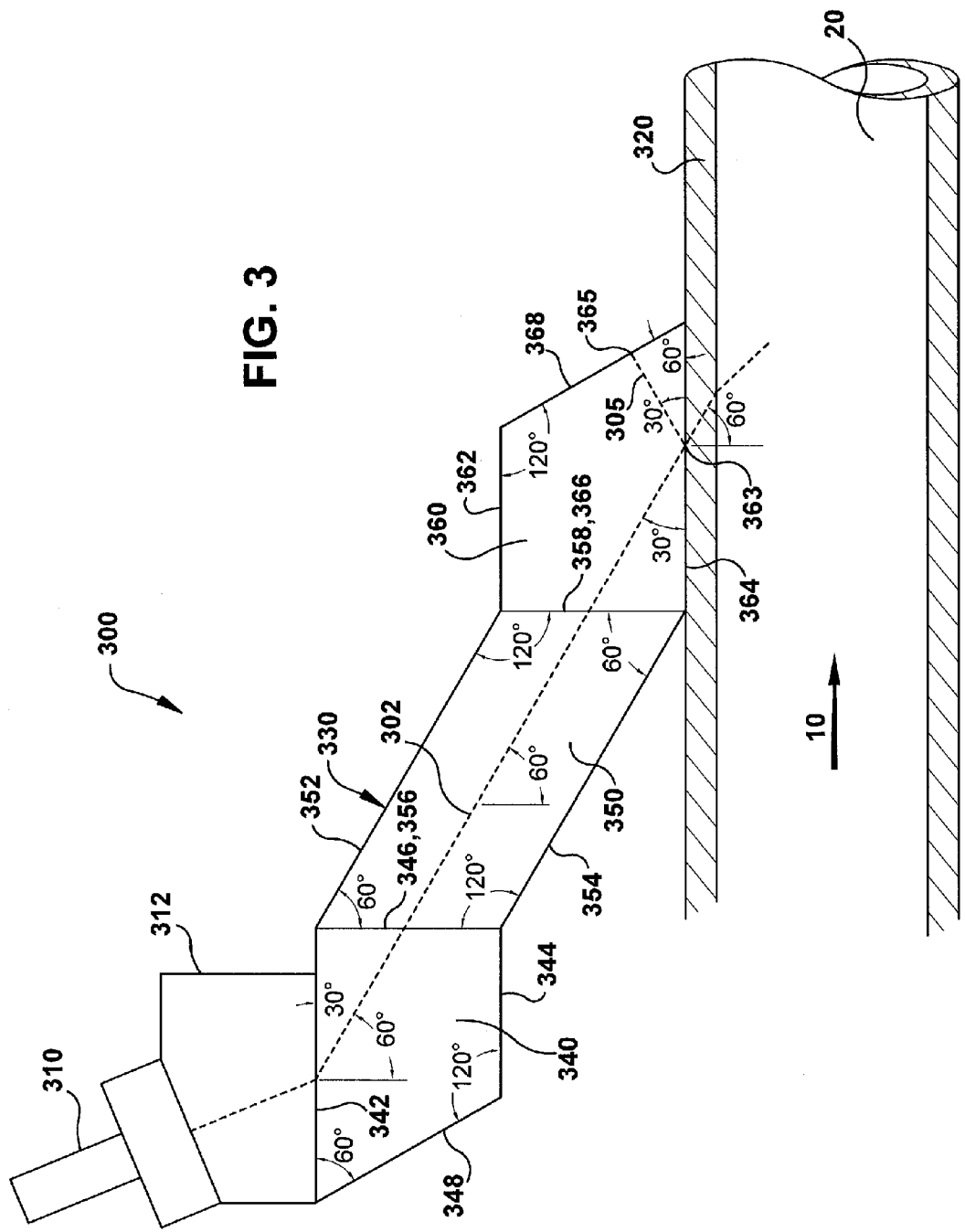
FIG. 3 is a side view of an ultrasonic coupler assembly in an exemplary embodiment of the invention.

In one embodiment shown in FIG. 3, the ultrasonic coupler assembly 300 comprises an ultrasonic coupler 330 having three quadrilateral sections—a rhomboid section 350 between and connecting a first trapezoid section 340 and a second trapezoid section 360—that form a single ultrasonic coupler 330 that is proximate the wedge 312 and/or ultrasonic transducer 310 at one end and the pipe wall 320 at the other end. As used herein, a quadrilateral is a polygon with four sides and four corners with angles that add to 360°, a trapezoid has one pair of opposite and parallel sides, and a rhomboid is a parallelogram (two pairs of opposite and parallel sides) in which adjacent sides are of unequal lengths and all of the angles are oblique. It will be understood that, although the ultrasonic coupler 330 is disclosed as having three sections, it can typically be implemented and manufactured as a single piece. In one embodiment, the ultrasonic coupler assembly 300 can include both the ultrasonic coupler 330 and the wedge 312, while in another embodiment, the ultrasonic coupler assembly 300 can include only the ultrasonic coupler 330.

For illustration of the exemplary embodiment, the wedge 312 and/or ultrasonic transducer 310 are located proximate the first trapezoid section 340 and the pipe wall 320 is located proximate the second trapezoid section 360, although the opposite configuration (i.e., the wedge 312 and/or ultrasonic transducer 310 are located proximate the second trapezoid section 360 and the pipe wall 320 is located proximate the first trapezoid section 340) can also be employed given the symmetry and flexibility of the exemplary ultrasonic coupler 330. In one embodiment, the ultrasonic coupler 330 is configured such that the ultrasonic path 302 of the ultrasonic signal through the ultrasonic coupler 330 is substantially straight from the first trapezoid section 340 to the second trapezoid section 360 and does not require any redirection for proper entry into the pipe wall 320, improving the accuracy of the resulting ultrasonic flow measurements.

In the embodiment shown in FIG. 3, the first trapezoid section 340 of the ultrasonic coupler 330 has a top side 342 extending from the left end of the top side 352 of the rhomboid section 350 and proximate the wedge 312 and/or ultrasonic transducer 310, a bottom side 344 extending from the left end of the bottom side 354 of the rhomboid section 350, a right side 346 adjacent to the left side 356 of the rhomboid section 350, and a left side 348. The top side 342 is parallel to the bottom side 344. The right side 346 forms right angles with the top side 342 and the bottom side 344. The left side 348 forms an acute angle (e.g., 60°) with the top side 342 and an obtuse angle (e.g., 120° with the bottom side 344.

In the embodiment shown in FIG. 3, the rhomboid section 350 of the ultrasonic coupler 330 has a top side 352 extending from the right end of the top side 342 of the first trapezoid section 340 to the left end of the top side 362 of the second trapezoid section 360 and on the same side as the wedge 312 and/or ultrasonic transducer 310. The rhomboid section 350 also has a bottom side 354 extending from the right end of the bottom side 344 of the first trapezoid section 340 to the left end of the bottom side 364 of the second trapezoid section 360 and on the same side as the pipe wall 320, a left side 356 adjacent to the right side 346 of the first trapezoid section 340, as well as a right side 358 adjacent to the left side 366 of the second trapezoid section 360. The top side 352 is parallel to the bottom side 354, and the left side 356 is parallel to the right side 358. The left side 356 forms an acute angle (e.g., 60°) with the top side 352 and an obtuse angle (e.g., 120°) with the bottom side 354. The right side 358 forms an obtuse angle (e.g., 120° with the top side 352 and an acute angle (e.g., 60°) with the bottom side 354. The length of the rhomboid section 350 can be adjusted based on the expected temperature of the pipe wall 320 and the amount of signal conditioning required.

In the embodiment shown in FIG. 3, the second trapezoid section 360 of the ultrasonic coupler 330 has a top side 362 extending from the right end of the top side 352 of the rhomboid section 350, a bottom side 364 extending from the right end of the bottom side 354 of the rhomboid section 350 and proximate the pipe wall 320, a left side 366 adjacent to the right side 358 of the rhomboid section 350, and a right side 368. The top side 362 is parallel to the bottom side 364. The left side 366 forms right angles with the top side 362 and the bottom side 364. The right side 368 forms an obtuse angle (e.g., 120° with the top side 362 and an acute angle (e.g., 60°) with the bottom side 364.

In one aspect of the embodiment shown in FIG. 3, the ultrasonic coupler 330, and in particular the acute angle between the right side 368 and the bottom side 364 of the second trapezoid section 360, is configured such that the portion of the main ultrasonic signal that is reflected at the interface point 363 between the ultrasonic coupler 330 and the pipe wall 320 is reflected along a reflected ultrasonic path 305 that is normal to the right side 368 of the second trapezoid section 360. When the reflected ultrasonic signal traveling on the reflected ultrasonic path 305 contacts the right side 368 at point 365, it is reflected back along the reflected ultrasonic path 305 and ultrasonic path 302 through the ultrasonic coupler 330 such that it will travel back to the ultrasonic transducer 310. This reflected ultrasonic signal can then be used to monitor the change in the time of flight of the ultrasonic signal in the ultrasonic coupler 330 due to any change in temperature of the ultrasonic coupler 330. In one embodiment and as shown in FIG. 3, in order to produce a reflected ultrasonic signal that is normal to the right side 368, the angle between the top side 362 and right side 368 of the second trapezoid section 360 (e.g., 60°) can be selected to be the same as the angle formed between the ultrasonic path 302 through the ultrasonic coupler 330 and the plane normal to the flow direction 10 (and the surface of the pipe wall 320) (e.g., 60°).

Figure 4:
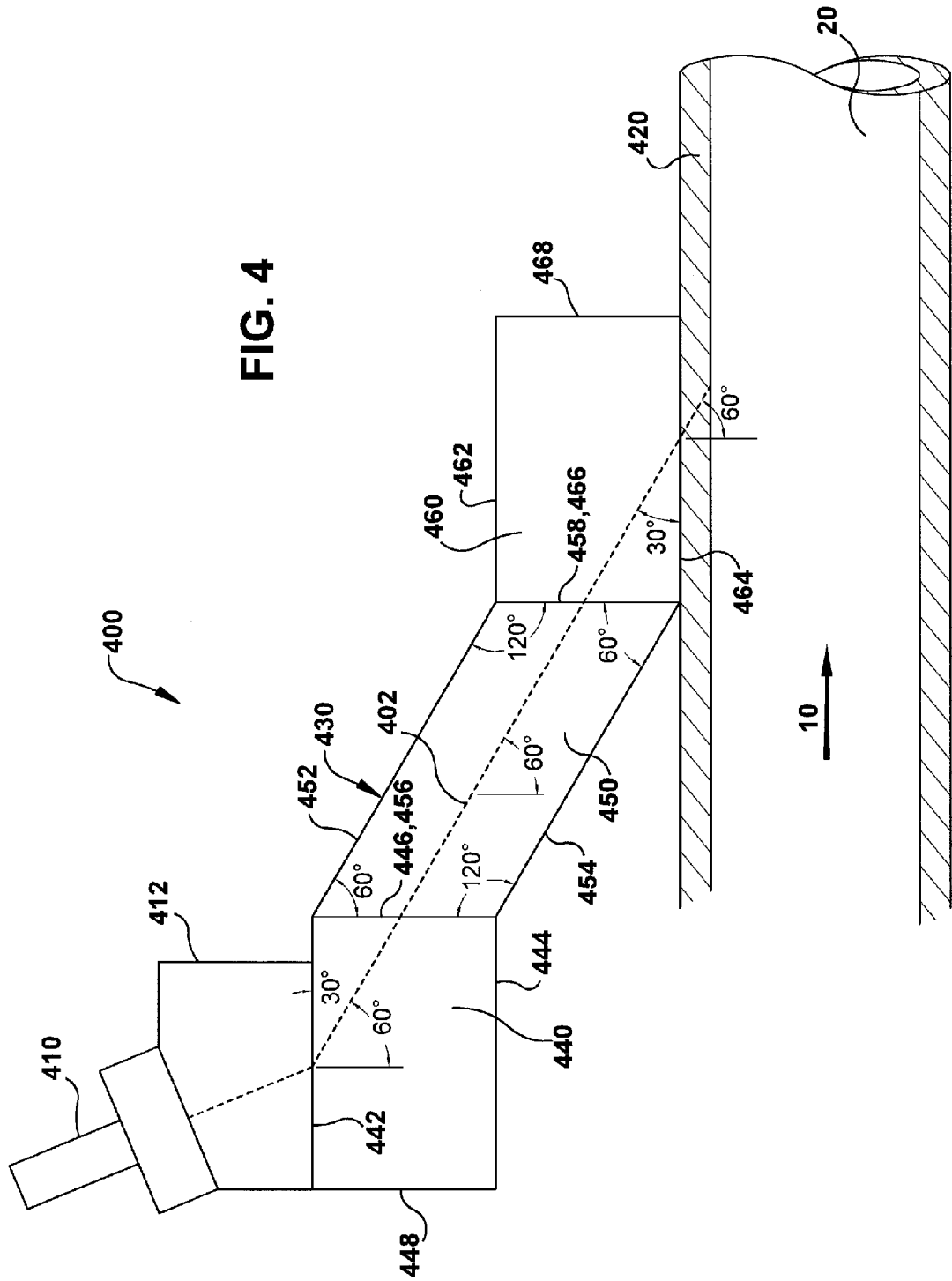
FIG. 4 is a side view of an ultrasonic coupler assembly in another exemplary embodiment of the invention.

In another embodiment shown in FIG. 4, the ultrasonic coupler assembly 400 comprises an ultrasonic coupler 430 having three quadrilateral sections—a rhomboid section 450 between and connecting a first orthogonal parallelogram section 440 and a second orthogonal parallelogram section 460—that form a single ultrasonic coupler 430 that is proximate the wedge 412 and/or ultrasonic transducer 410 at one end and the pipe wall 420 at the other end. As used herein, a quadrilateral is a polygon with four sides and four corners with angles that add to 360°, an orthogonal parallelogram is a parallelogram (two pairs of opposite and parallel sides) where the sides form four right (90°) angles (e.g., square or a rectangle), and a rhomboid is a parallelogram in which adjacent sides are of unequal lengths and all of the angles are oblique. It will be understood that, although the ultrasonic coupler 430 is disclosed as having three sections, it can typically be implemented and manufactured as a single piece. In one embodiment, the ultrasonic coupler assembly 400 can include both the ultrasonic coupler 430 and the wedge 412, while in another embodiment, the ultrasonic coupler assembly 400 can include only the ultrasonic coupler 430.

For illustration of the exemplary embodiment, the wedge 412 and/or ultrasonic transducer 410 are located proximate the first orthogonal parallelogram section 440 and the pipe wall 420 is located proximate the second orthogonal parallelogram section 460, although the opposite configuration (i.e., the wedge 412 and/or ultrasonic transducer 410 are located proximate the second orthogonal parallelogram section 460 and the pipe wall 420 is located proximate the first orthogonal parallelogram section 440) can also be employed given the symmetry and flexibility of the exemplary ultrasonic coupler 430. In one embodiment, the ultrasonic coupler 430 is configured such that the ultrasonic path 402 of the ultrasonic signal through the ultrasonic coupler 430 is substantially straight from the first orthogonal parallelogram section 440 to the second orthogonal parallelogram section 460 and does not require any redirection for proper entry into the pipe wall 420, improving the accuracy of the resulting ultrasonic flow measurements.

In the embodiment shown in FIG. 4, the first orthogonal parallelogram section 440 of the ultrasonic coupler 430 has a top side 442 extending from the left end of the top side 452 of the rhomboid section 450 and proximate the wedge 412 and/or ultrasonic transducer 410, a bottom side 444 extending from the left end of the bottom side 454 of the rhomboid section 450, a right side 446 adjacent to the left side 456 of the rhomboid section 450, and a left side 448. The top side 442 is parallel to the bottom side 444, and the right side 446 is parallel to the left side 448. The right side 446 forms right angles with the top side 442 and the bottom side 444, and the left side 448 forms right angles with the top side 442 and the bottom side 444.

In the embodiment shown in FIG. 4, the rhomboid section 450 of the ultrasonic coupler 430 has a top side 452 extending from the right end of the top side 442 of the first orthogonal parallelogram section 440 to the left end of the top side 462 of the second orthogonal parallelogram section 460 and on the same side as the wedge 412 and/or ultrasonic transducer 410, a bottom side 454 extending from the right end of the bottom side 444 of the first orthogonal parallelogram section 440 to the left end of the bottom side 464 of the second orthogonal parallelogram section 460 and on the same side as the pipe wall 420, a left side 456 adjacent to the right side 446 of the first orthogonal parallelogram section 440, and a right side 458 adjacent to the left side 466 of the second orthogonal parallelogram section 460. The top side 452 is parallel to the bottom side 454, and the left side 456 is parallel to the right side 458. The left side 456 forms an acute angle (e.g., 60°) with the top side 452 and an obtuse angle (e.g., 120°) with the bottom side 454. The right side 458 forms an obtuse angle (e.g., 120°) with the top side 462 and an acute angle (e.g., 60°) with the bottom side 464. The length of the rhomboid section 450 can be adjusted based on the expected temperature of the pipe wall 420 and the amount of signal conditioning required.

In the embodiment shown in FIG. 4, the second orthogonal parallelogram section 460 of the ultrasonic coupler 430 has a top side 462 extending from the right end of the top side 452 of the rhomboid section 450, a bottom side 464 extending from the right end of the bottom side 454 of the rhomboid section 450 and proximate the pipe wall 420, a left side 466 adjacent to the right side 458 of the rhomboid section 450, and a right side 468. The top side 462 is parallel to the bottom side 464, and the right side 468 is parallel to the left side 466. The left side 466 forms right angles with the top side 462 and the bottom side 464, and the right side 468 forms right angles with the top side 462 and the bottom side 464.

As shown in the embodiments of FIGS. 3 and 4, the ultrasonic couplers 330, 430 each have a rhomboid section 350, 450 between and connecting a first quadrilateral section 340, 440 and a second quadrilateral section 360, 460. It will be understood that the first quadrilateral section 340, 440 and the second quadrilateral section 360, 460 can be the same shape or different shapes (e.g., the first quadrilateral section can be an orthogonal parallelogram while the second quadrilateral section can be a trapezoid or vice versa). It will also be understood that, although the disclosed embodiments of the ultrasonic couplers 330 are configured or oriented so as to go from top to bottom from left to right, those same ultrasonic couplers can be flipped or reoriented so as to from top to bottom from right to left, or any orientation between the two.

Figure 5:
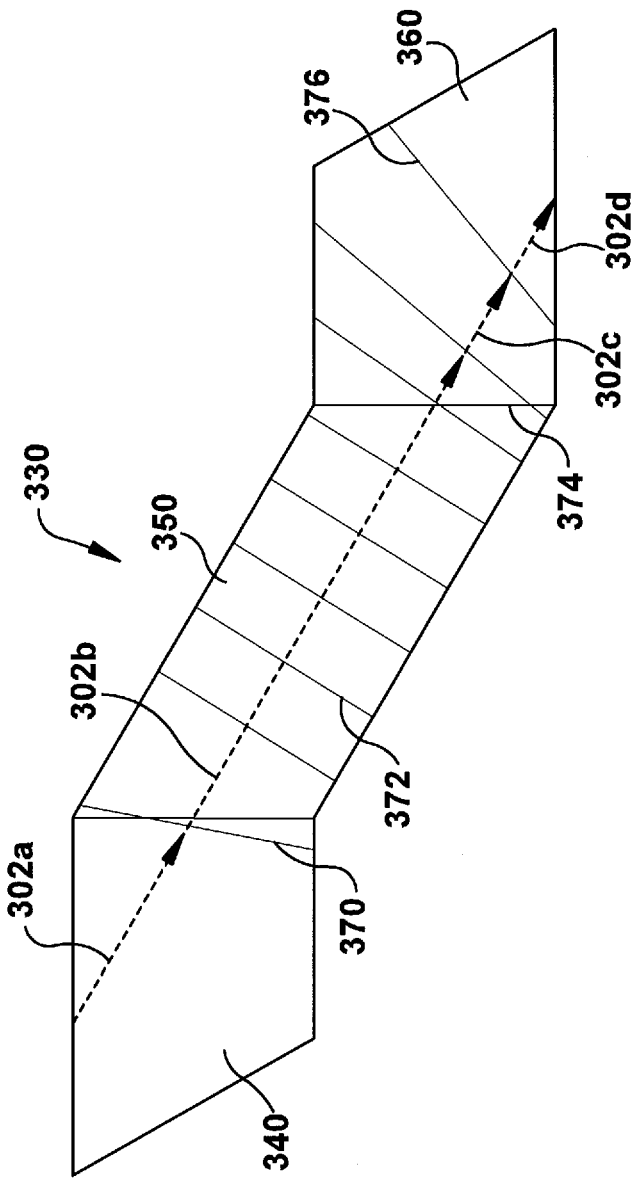
FIG. 5 is a temperature profile of an ultrasonic coupler in an exemplary embodiment of the invention.

FIG. 5 is a temperature profile of an ultrasonic coupler 330 in an exemplary embodiment of the invention. Since the speed of sound in the ultrasonic coupler 330 is mildly dependent on the temperature of the ultrasonic coupler 330, due to Snell's law, any angle between the ultrasonic signal traveling on the ultrasonic paths 302a, 302b, 302c, 302d and the normal of the isotherms 370, 372, 374, 376 of the ultrasonic coupler 330 will result in undesired refraction of a portion of the original ultrasonic signal from its original angle as it entered the ultrasonic coupler 330. As shown in FIG. 5, the configuration of the ultrasonic coupler 330 results in isotherms 370, 372, 374, 376 that are substantially perpendicular to the ultrasonic paths 302a, 302b, 302c, 302d, minimizing reflection and refraction and increasing the accuracy of flow meter measurements. For example, in the rhomboid section 350 section of the ultrasonic coupler 330, all of the isotherms 372 are substantially perpendicular to the ultrasonic path 302b throughout that section.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An ultrasonic coupler assembly for coupling an ultrasonic transducer to a pipe wall comprising:
   a first quadrilateral section configured to receive an ultrasonic signal from the ultrasonic transducer;
   a second quadrilateral section configured to be coupled to an exterior surface of the pipe wall; and
   a rhomboid section between and connecting the first quadrilateral section and the second quadrilateral section, wherein a first side of the rhomboid section is adjacent to the first quadrilateral section and a second side of the rhomboid section is adjacent to the second quadrilateral section.

2. An ultrasonic coupler assembly for coupling an ultrasonic transducer to a pipe wall comprising:
   a first quadrilateral section;
   a second quadrilateral section; and
   a rhomboid section between and connecting the first quadrilateral section and the second quadrilateral section, wherein the rhomboid section comprises a top side extending from the right end of the top side of the first quadrilateral section to the left end of the top side of the second quadrilateral section, a bottom side extending from the right end of the bottom side of the first quadrilateral section to the left end of the bottom side of the second quadrilateral section, a left side adjacent to the right side of the first quadrilateral section, and a right side adjacent to the left side of the second quadrilateral section, wherein the top side is parallel to the bottom side, the left side is parallel to the right side, the left side forms an acute angle with the top side and an obtuse angle with the bottom side, and the right side forms an obtuse angle with the top side and an acute angle with the bottom side.

3. The ultrasonic coupler assembly of claim 1, wherein the first quadrilateral section is a trapezoid.

4. The ultrasonic coupler assembly of claim 3, wherein the first quadrilateral section comprises a top side extending from the right end of the top side of the rhomboid section, a bottom side extending from the left end of the bottom side of the rhomboid section, a right side adjacent to the left side of the rhomboid section, and a left side, wherein the top side is parallel to the bottom side, the right side forms right angles with the top side and the bottom side, and the left side forms an acute angle with the top side and an obtuse angle with the bottom side.

5. The ultrasonic coupler assembly of claim 1, wherein the second quadrilateral section is a trapezoid.

6. The ultrasonic coupler assembly of claim 5, wherein the second quadrilateral section comprises a top side extending from the right end of the top side of the rhomboid section, a bottom side extending from the right end of the bottom side of the rhomboid section, a left side adjacent to the right side of the rhomboid section, and a right side, wherein the top side is parallel to the bottom side, the left side forms right angles with the top side and the bottom side, and the right side forms an obtuse angle with the top side and an acute angle with the bottom side.

7. The ultrasonic coupler assembly of claim 1, wherein the first quadrilateral section is an orthogonal parallelogram.

8. The ultrasonic coupler assembly of claim 7, wherein the first quadrilateral section comprises a top side extending from the left end of the top side of the rhomboid section, a bottom side extending from the left end of the bottom side of the rhomboid section, a right side adjacent to the left side of the rhomboid section, and a left side, wherein the top side is parallel to the bottom side, the right side is parallel to the left side, the right side forms right angles with the top side and the bottom side, and the left side forms right angles with the top side and the bottom side.

9. The ultrasonic coupler assembly of claim 1, wherein the second quadrilateral section is an orthogonal parallelogram.

10. The ultrasonic coupler assembly of claim 9, wherein the second quadrilateral section comprises a top side extending from the right end of the top side of the rhomboid section, a bottom side extending from the right end of the bottom side of the rhomboid section, a left side adjacent to the right side of the rhomboid section, and a right side, wherein the top side is parallel to the bottom side, the right side is parallel to the left side, the left side forms right angles with the top side and the bottom side, and the right side forms right angles with the top side and the bottom side.

11. The ultrasonic coupler assembly of claim 1, further comprising a wedge proximate the top side of the first quadrilateral section.

12. The ultrasonic coupler assembly of claim 1, further comprising a wedge proximate the bottom side of the second quadrilateral section.

13. The ultrasonic coupler assembly of claim 6, wherein the acute angle between the right side of the second quadrilateral section and the bottom side of the second quadrilateral section is configured such that the portion of a main ultrasonic signal that is reflected at an interface point between the bottom side of the second quadrilateral section and the pipe wall is reflected along a reflected ultrasonic path that is normal to the right side of the second quadrilateral section.

14. The ultrasonic coupler assembly of claim 1, wherein the first quadrilateral section, the second quadrilateral section, and the rhomboid section are manufactured as a single piece.

15. An ultrasonic coupler assembly for coupling an ultrasonic transducer to a pipe wall comprising:
a first trapezoid section;
a second trapezoid section; and
a rhomboid section between and connecting the first trapezoid section and the second trapezoid section,
wherein the rhomboid section comprises a top side extending from the right end of the top side of the first trapezoid section to the left end of the top side of the second trapezoid section, a bottom side extending from the right end of the bottom side of the first trapezoid section to the left end of the bottom side of the second trapezoid section, a left side adjacent to the right side of the first trapezoid section, and a right side adjacent to the left side of the second trapezoid section, wherein the top side is parallel to the bottom side, the left side is parallel to the right side, the left side forms an acute angle with the top side and an obtuse angle with the bottom side, and the right side forms an obtuse angle with the top side and an acute angle with the bottom side,
wherein the first trapezoid section comprises a top side extending from the right end of the top side of the rhomboid section, a bottom side extending from the left end of the bottom side of the rhomboid section, a right side adjacent to the left side of the rhomboid section, and a left side, wherein the top side is parallel to the bottom side, the right side forms right angles with the top side and the bottom side, and the left side forms an acute angle with the top side and an obtuse angle with the bottom side, and
wherein the second trapezoid section comprises a top side extending from the right end of the top side of the rhomboid section, a bottom side extending from the right end of the bottom side of the rhomboid section, a left side adjacent to the right side of the rhomboid section, and a right side, wherein the top side is parallel to the bottom side, the left side forms right angles with the top side and the bottom side, and the right side forms an obtuse angle with the top side and an acute angle with the bottom side.

16. The ultrasonic coupler assembly of claim 15, further comprising a wedge proximate the top side of the first trapezoid section.

17. The ultrasonic coupler assembly of claim 15, further comprising a wedge proximate the bottom side of the second trapezoid section.

18. An ultrasonic coupler assembly for coupling an ultrasonic transducer to a pipe wall comprising:
a first orthogonal parallelogram section;
a second orthogonal parallelogram section; and
a rhomboid section between and connecting the first orthogonal parallelogram section and the second orthogonal parallelogram section,
wherein the rhomboid section comprises a top side extending from the right end of the top side of the first orthogonal parallelogram section to the left end of the top side of the second orthogonal parallelogram section, a bottom side extending from the right end of the bottom side of the first orthogonal parallelogram section to the left end of the bottom side of the second orthogonal parallelogram section, a left side adjacent to the right side of the first orthogonal parallelogram section, and a right side adjacent to the left side of the second orthogonal parallelogram section, wherein the top side is parallel to the bottom side, the left side is parallel to the right side, the left side forms an acute angle with the top side and an obtuse angle with the bottom side, and the right side forms an obtuse angle with the top side and an acute angle with the bottom side,
wherein the first orthogonal parallelogram section comprises a top side extending from the left end of the top side of the rhomboid section, a bottom side extending from the left end of the bottom side of the rhomboid section, a right side adjacent to the left side of the rhomboid section, and a left side, wherein the top side is parallel to the bottom side, the right side is parallel to the left side, the right side forms right angles with the top side and the bottom side, and the left side forms right angles with the top side and the bottom side, and wherein the second orthogonal parallelogram section comprises a top side extending from the right end of the top side of the rhomboid section, a bottom side extending from the right end of the bottom side of the rhomboid section, a left side adjacent to the right side of the rhomboid section, and a right side, wherein the top side is parallel to the bottom side, the right side is parallel to the left side, the left side forms right angles with the top side and the bottom side, and the right side forms right angles with the top side and the bottom side.

19. The ultrasonic coupler assembly of claim 18, further comprising a wedge proximate the top side of the first orthogonal parallelogram section.

20. The ultrasonic coupler assembly of claim 18, further comprising a wedge proximate the bottom side of the second orthogonal parallelogram section.

* * * * *